United States Patent [19]
Gaffaney et al.

[11] Patent Number: 5,634,008
[45] Date of Patent: May 27, 1997

[54] METHOD AND SYSTEM FOR THRESHOLD OCCURRENCE DETECTION IN A COMMUNICATIONS NETWORK

[75] Inventors: Nathan J. Gaffaney; Jeffrey M. Weiner, both of Cary, N.C.

[73] Assignee: International Business Machines Corporation, Armonk, N.Y.

[21] Appl. No.: 276,746

[22] Filed: Jul. 18, 1994

[51] Int. Cl.[6] .................................................. G06F 7/02
[52] U.S. Cl. ........................... 395/200.11; 395/800
[58] Field of Search ........................... 395/800, 200.08, 395/200.11, 850, 200.01; 371/5

[56] References Cited

U.S. PATENT DOCUMENTS

| | | | |
|---|---|---|---|
| 4,080,589 | 3/1978 | Kline | 235/92 EC |
| 4,291,403 | 9/1981 | Waddill et al. | 371/5 |
| 4,339,657 | 7/1982 | Larson et al. | 235/92.06 |
| 4,823,345 | 4/1989 | Daniel et al. | 371/37 |
| 5,049,873 | 9/1991 | Robins et al. | 340/825.06 |
| 5,223,827 | 6/1993 | Bell et al. | 371/5.1 |
| 5,233,545 | 8/1993 | Ho et al. | 364/569 |
| 5,423,039 | 6/1995 | Matteson | 395/650 |
| 5,485,628 | 1/1996 | Clements | 395/800 |

OTHER PUBLICATIONS

Partridge et al, "Hems Variables Definitions", Network Working Group, RFC 1024, Oct. 1987, pp. 1–74.
Case et al, "Manager–to–Manager Management Information Base", Network Working Group, RFC 1451, Apr. 1993 pp. 1–36.
S. Waldbusser, "Remote Network Monitoring Management Information Base", Network Working Group, RFC 1271, Nov. 1991, pp. 1–81.

*Primary Examiner*—Mehmet B. Geckil
*Attorney, Agent, or Firm*—John J. Timar

[57] ABSTRACT

Method and System for determining when a threshold condition representing the occurrence of a user specified number of events for a monitored activity has occurred within a specified time interval. For each threshold condition that is monitored, storage is allocated to save a number of timestamps equal to the specified number of events, with each timestamp representing the time of occurrence of an associated event. After all allocated storage locations for the threshold condition have been filled, a test is made with the occurrence of each new event to determine if the difference between the new timestamp and a designated stored timestamp is less than or equal to the specified time interval. Meeting this test represents detection of the threshold condition and results in the execution of specified automation actions.

16 Claims, 6 Drawing Sheets

| | | | | |
|---|---|---|---|---|

FIG. 3B

| 3/1/93 1:03PM | | | | |
|---|---|---|---|---|

FIG. 3C

| 3/1/93 1:03PM | 3/1/93 1:57PM | 3/1/93 2:01PM | 3/1/93 2:24PM | 3/1/93 2:32PM |
|---|---|---|---|---|

FIG. 3D

| 3/1/93 2:42PM | 3/1/93 1:57PM | 3/1/93 2:01PM | 3/1/93 2:24PM | 3/1/93 2:32PM |
|---|---|---|---|---|

FIG. 3E

| 3/1/93 2:42PM | 3/1/93 2:46PM | 3/1/93 2:01PM | 3/1/93 2:24PM | 3/1/93 2:32PM |
|---|---|---|---|---|

| ACTION | DESCRIPTION |
| --- | --- |
| DISPLAY | DISPLAYS THE MESSAGE |
| HCYLOG | LOGS THE MESSAGE IN HARDCOPY LOG |
| HOLD | HOLDS THE MESSAGE ON THE SCREEN |
| NETLOG | LOGS THE MESSAGE IN THE NETWORK LOG |
| SYSLOG | LOGS THE MESSAGE IN THE SYSTEM LOG |
| SRF | SETS RECORDING-FILTER ATTRIBUTES FOR THE MSU |
| XLO | SPECIFIES EXTERNAL LOGGING ONLY |
| BEEP | SPECIFIES TO SOUND AN AUDIBLE ALARM |
| CNM4931 | SPECIFIES WHETHER CNM4931 MESSAGES SHOULD BE WRITTEN TO THE NETWORK LOG FOR THIS STATEMENT |
| COLOR | SETS FOREGROUND COLOR |
| CONTINUE | SPECIFIES TO CONTINUE TABLE PROCESSING FOR THE MESSAGE OR MSU |
| EXEC | SPECIFIES A COMMAND TO ISSUE OR, FOR MESSAGES, CONTROLS ROUTING |
| HIGHINT | SETS HIGH-INTENSITY 3270 MODE |
| XHILITE | SETS FOREGROUND HIGHLIGHTING |

METHOD AND SYSTEM FOR THRESHOLD OCCURRENCE DETECTION IN A COMMUNICATIONS NETWORK

BACKGROUND OF THE INVENTION

Network management programs require the ability to specify a "threshold" number of occurrences for different network and system failures so that the automation processing performed by the network management programs can make smarter decisions on which automated action to perform for different situations.

The threshold is a specified number of occurrences of an event within a specified time period which becomes the triggering mechanism for the performance of particular actions. For example, if the same network device had failed more than five times within a one hour time period, a different recovery procedure could be attempted as opposed to what would be done if the device had failed only once in that one hour time period. The threshold in this case is the occurrence of more than five failures within a one hour period.

Enabling an automation process in the network management program to determine whether a threshold has been reached regarding the frequency of an identical or similar system or network problem within a specified time period allows the network management program to make complex decisions on which automation action to perform. There are numerous scenarios in which system and network problems result in the issuance of messages or alerts that must be considered as a group rather than individually. For example, if a network device fails, and all devices connected to the device send an alert to the network management program, one indication of the failing device is all that is required for recovery; all other alerts can be ignored, thereby saving valuable system processing time. If the resulting burst of alerts from a major outage is not filtered based on a threshold, the burst can slow the network management processing to the point that resolution of, and recovery from, the outage problem takes a long period of time.

Providing a function in the network management program to determine a threshold level for system and network events (specifically, messages and alerts) allows the automation capability of the program to make an additional determination when deciding how a system or network problem can be solved automatically. Automation thresholding allows system and network automation to make more human-like decisions.

Event counting and thresholding is well known in the computing and networking arts. In U.S. Pat. No. 4,080,589, the occurrence of an error triggers a timer and begins a counting interval. Subsequent errors occurring during the interval are counted until a predetermined threshold is reached or the timing interval expires. An alarm is signalled and the timer is reset if the threshold is reached before expiration of the time interval. In U.S. Pat. No. 4,291,403, if the error count exceeds the predetermined threshold during an established time period, an alarm is generated and a second threshold is established to measure subsequent error rates. In U.S. Pat. No. 4,339,657, a variable time interval is established that is measured by the occurrence of a predetermined number of operations. The arrangement counts errors occurring during the operations and also counts the number of times that the error count crosses a predetermined threshold.

U.S. Pat. No. 5,223,827, having the same assignee as the present invention, improves on the other prior art by providing a mechanism for managing network event counters that enables the accumulation of information that can be manipulated to provide a variety of performance measurements. It makes use of an event counter, a sliding event threshold counter and a sliding interval counter for detection of an event threshold that requires performance of some type of action in response. Each time an event counter exceeds a threshold established by the sliding threshold event counter, the sliding threshold event counter is incremented by the contents of an offset, event value, and the sliding counter is updated to the sum of the offset time value and the present time. The disclosure of this patent is incorporated by reference herein.

While the known art is useful in many instances, the art does not provide a system or method for determining whether a specified threshold condition has been reached without the use of timers or counters, and without the need to recalculate time intervals for event occurrence. If a large number of threshold conditions has been specified, using prior art techniques, it becomes necessary to provide a multiplicity of timers or counters, and to recalculate time intervals for each of the threshold conditions.

The present invention improves on prior art techniques by eliminating the need for maintenance of multiple timers or counters and for recalculating time intervals in order to determine whether or not prescribed threshold conditions associated with a plurality of events associated with a plurality of devices (resources) in a communications network have been detected.

SUMMARY OF THE INVENTION

It is an object of the invention to provide a more efficient system and method for detecting a threshold occurrence of events in a communications network.

It is another object of the invention to provide a system and method for detecting a threshold occurrence of events that does not require the use of timers and/or counters or the recalculation of time intervals, to determine when a threshold condition has occurred.

It is a further object of the invention to provide a system and method for detecting a threshold occurrence of events that results in the execution of a prescribed automation procedure based on whether or not a specified threshold condition has occurred.

These and other objects and advantages are accomplished by the present invention in which a systems programmer, network operator or computer user specifies for at least one device (e.g., hardware component or software application) in a communications network one or more threshold conditions to be monitored which are entered into an automation table along with a prescribed automation procedure to be performed when the associated threshold condition has been detected. For each threshold condition monitored, a number of event occurrences and a time period is specified. Storage is allocated to save a timestamp associated with each event occurrence. The number of bytes in memory allocated for each event timestamp is based on the number of event occurrences specified as part of each threshold condition. Thus, this invention is efficient in terms of memory utilization, reserving only the number of blocks of storage sufficient to store the threshold number of events.

For each event's occurrence, the host system time-of-day clock is used to generate a corresponding timestamp to store in the allocated locations in memory. The allocated locations are used for storage of timestamps sequentially with a pointer indicating the next position to fill. The allocated locations are linked such that after the last allocated location is filled, the pointer will be reset to indicate the first allocated location for storage of the next timestamp. After all allocated locations are filled, occurrence of each new event results in a comparison between its associated timestamp and the timestamp stored in the allocated location designated by the pointer. If the difference is less than the threshold time interval, then the threshold number of events has occurred. After the comparison is made, the timestamp of the new event is stored in the designated location, replacing the previously stored timestamp. An automation procedure is activated in response to threshold condition.

BRIEF DESCRIPTION OF THE DRAWINGS

This invention will be described with respect to a preferred embodiment thereof which is further illustrated and described in the drawings.

DETAILED DESCRIPTION OF THE PREFERRED EMBODIMENT

The invention finds its application in present-day complex communications and data processing networks in which a variety of devices or products experiencing a variety of potential problems are managed from central control points by network control operators. In a typical IBM System Network Architecture (SNA) system, the network control functions are provided by a variety of management tools and processes, including IBM's NetView network management program product. Among the capabilities provided by NetView are automatic detection, isolation and notification to system operators of existing resource problems. Each individual product in an SNA network is responsible for detecting its own problem, performing analysis for isolating the problem and for reporting results of the analysis in the form of alerts to the network control operator. In some cases, a problem may be isolated to a single failing component in the network and the failing component will be identified in the alert. Where it is not possible for the detecting product to isolate the failure to a network component, the problem detecting product will send information that will assist the network operator at the system control console to complete isolation of the failure to a single component.

The alert is the vehicle, in an SNA network, for notifying the network operator that a problem exists within the network. Alerts can be generated for any resource in the network. This makes it possible for an operator at the central control facility to manage not only the communications resources of the network such as controllers, communication links and modems, but also to manage such system resources as tape drive units and direct access storage devices (DASD), and printer and terminals. Such system resources usually have alerts sent on their behalf by the network component to which they are attached, for example, to an attached controller for a terminal. The use of communication network alert messages is described in U.S. Pat. No. 4,823,345 having the same assignee as the present invention, and is incorporated by reference herein.

Figure 1:
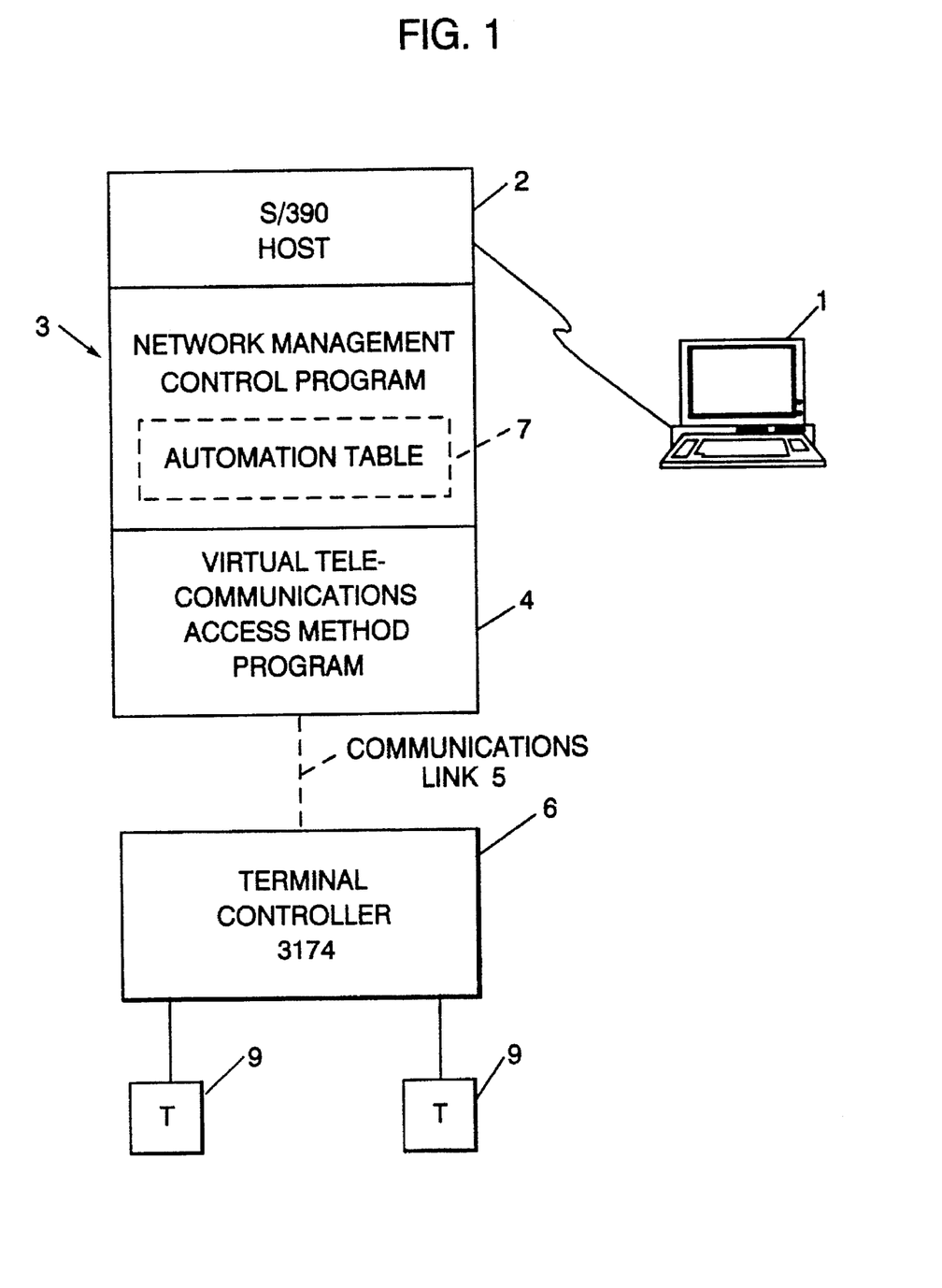
FIG. 1 schematically illustrates an embodiment of the invention environment for an IBM System/390 host operating as the network management control point for communications to an SNA-based communications network.

FIG. 1 illustrates a typical environment for an SNA data and communications network. The operator's display console indicated as box 1 is connected to a host CPU 2 which operates a network management control program 3 which communicates with session control program 4 internally in the host CPU 2. The session control program 4 operates over the communications link 5 to establish the SNA session. The communications link 5 connects the host 2 to a plurality of elements in the communication network. A single terminal controller 6 and two terminals 9 are illustrated in FIG. 1, but, of course, numerous such controllers and terminals may exist within a complex network. For the typical physical example of FIG. 1, the operator's console may be a typical 3270 display station and keyboard connected to a System/370 or System/390 host CPU 2. The network management control program 3 can be in the form of IBM's NetView program product. The SNA session control program 4 is managed by a virtual telecommunication access method such as IBM's VTAM program product also operating with the System/390 host. The terminal controller might be an IBM 3174. Such controllers contain sophisticated processors capable of generating and sending alerts. Applications running on the host 2, including the virtual telecommunications access method program 4, also create messages and alerts which are intercepted by the network management program 3 and then sent to the automation table 7 which decides upon appropriate actions.

The automation table 7 enables the network management control program 3 to respond automatically to messages and formatted alerts. In the IBM NetView program product, the formatted alerts are contained in a data structure called a management services unit (MSU). In addition to responding automatically to common messages and MSU's, the automation table allows the suppression of unwanted messages and the filtering out of unwanted alerts.

The invention is implemented by creating an automation table condition item "THRESHOLD" which allows the network operator to specify a number of event occurrences and a time period for a specific problem. If the THRESHOLD condition statement has evaluated the specified number of occurrences within the specified time period, the THRESHOLD condition evaluates to TRUE and corrective action is initiated automatically.

Figure 2:
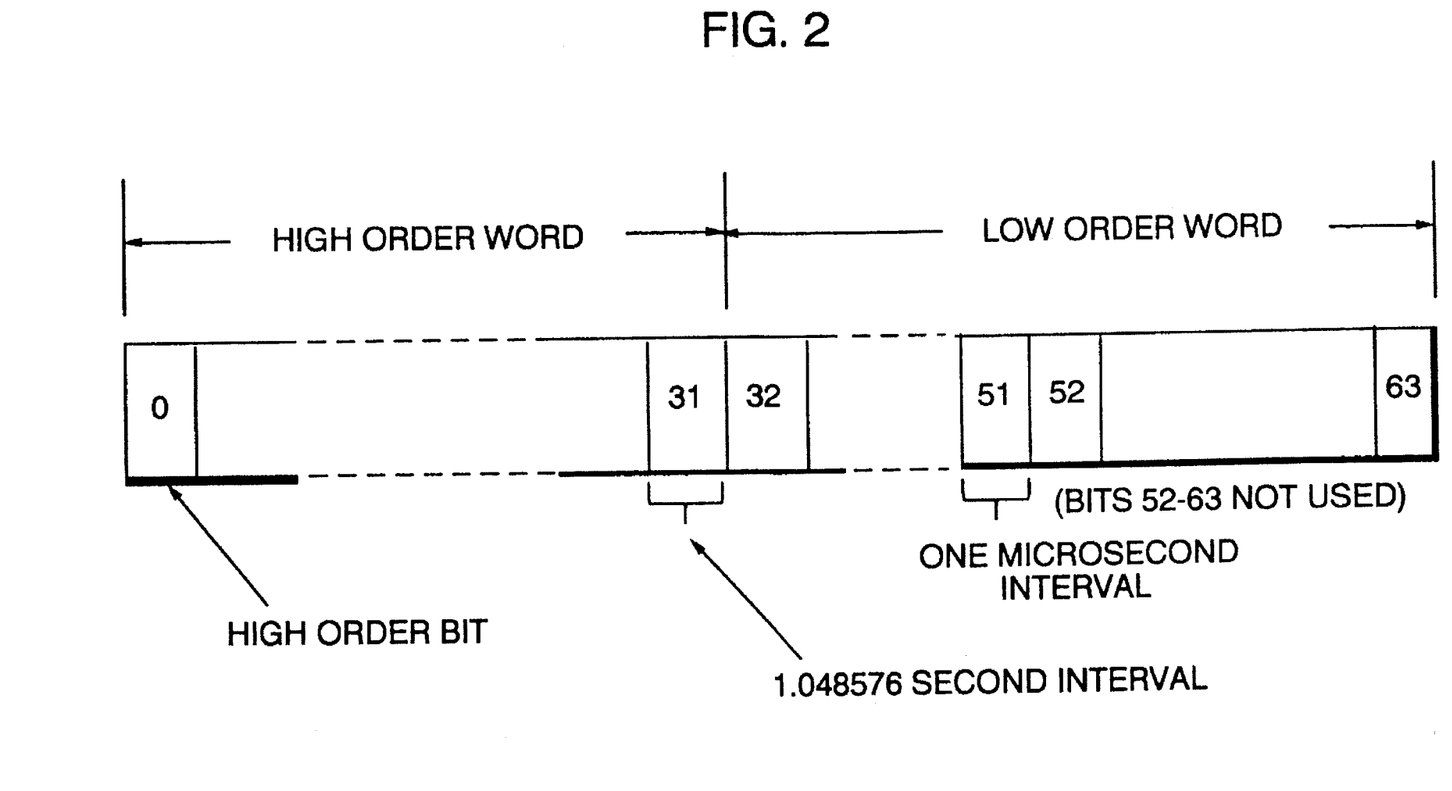
FIG. 2 illustrates the format for the System/390 host system time-of-day clock.

The mechanism used for determining whether the threshold condition has been met is the 8-byte system clock value that includes the system date and time. For an environment such as that of an IBM System/370 or System/390, the system clock stores the number of microseconds that have elapsed since Jan. 1, 1900. The clock value is 52 bits long (the 10 lowest order bits are not used), and thus can support up to 143 years. The Assembler language STCK instruction returns the system clock value. The most significant 5 bytes of the 8 byte system clock value are the only ones required if seconds is the least significant unit of time that will be dealt with. FIG. 2 shows the format of the system time-of-day clock used in the preferred embodiment.

A key aspect of this invention is that it provides a moving window by incorporating both time and the number of occurrences into a determination of whether or not a threshold condition has been satisfied. Simply with the passage of time, prior occurrences of an event may no longer be considered applicable when determining whether or not the threshold condition has been met because they are no longer within the time period specified. The time period can be as small as one second or as large as one year and still provide the same capabilities.

Figure 3A:
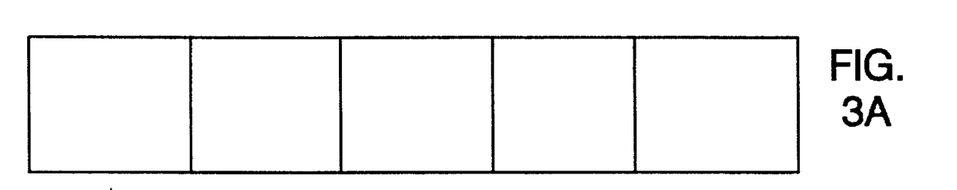
FIGS. 3A–3E illustrate an example of the allocation of storage locations for event occurrences associated with a specific threshold condition.

The simple example illustrated in FIGS. 3A-3E demonstrates the operation of the invention. If a threshold condition of 5 occurrences within a one hour time frame is specified, the representation of how the occurrence data is stored in memory could be as depicted in FIG. 3A which shows an array of 5 locations to store the system clock time stamp for each occurrence, and a moving pointer which points to the next occurrence location.

Figure 3B:
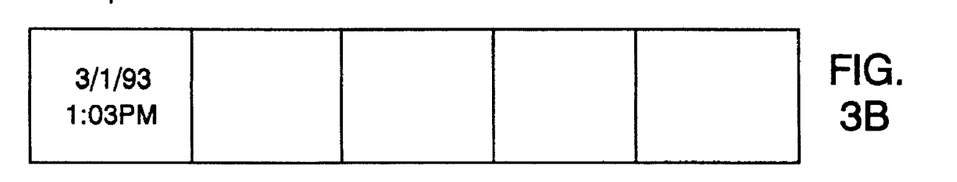

If the threshold condition is activated at 1:00 p.m. on Mar. 1, 1993, and an event occurrence arrives and is evaluated at 1:03 p.m., since the current occurrence location to be evaluated is empty, it is simply filled in with the system clock representation of the current date and time. The occurrence location pointer is moved to the next storage location. This is illustrated in FIG. 3B. The representation in FIG. 3B is for explanatory purposes; the actual system clock value is stored as bit data as previously described.

Figure 3C:
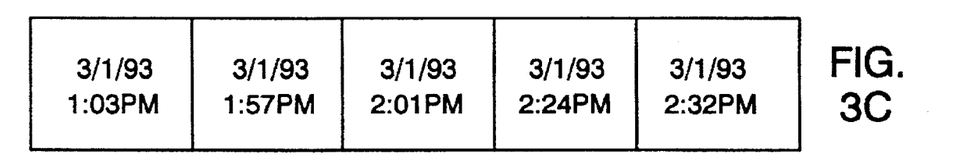

Next, if additional occurrences arrive and are processed at 1:57 p.m., 2:01 p.m., 2:24 p.m. and 2:32 p.m., the remainder of the originally empty occurrence location array is now filled in with the date and time that each occurrence took place. The array of filled in locations is represented in FIG. 3C.

Figure 3D:
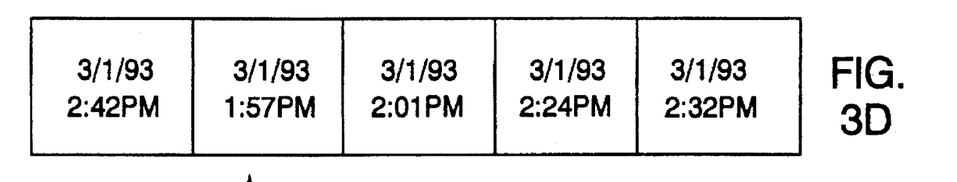

If an additional occurrence arrives and is processed at 2:42 p.m., the current date and time is compared to the date and time stored in the current occurrence location in order to determine if it is within the threshold time period. Since, in this example, the event occurrence at 2:42 p.m. is more than one hour after the date and time stored in the current location, the threshold condition evaluates FALSE, and the current date and time for the current occurrence location is changed to 2:42 p.m. This is depicted in FIG. 3D.

Figure 3E:
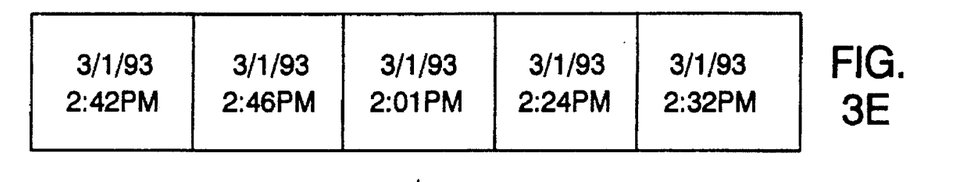

If an additional occurrence then arrives and is processed at 2:46 p.m., the current date and time is again compared to the date and time stored in the current occurrence location in order to determine if it is within the threshold time period of one hour. Since 2:46 p.m. is less than one hour after 1:57 p.m., the threshold condition evaluates TRUE, and the current date and time for the current threshold occurrence location is changed to 2:46 p.m. The automation action can then be scheduled in response to the threshold condition being evaluated as TRUE.

Figure 4A:
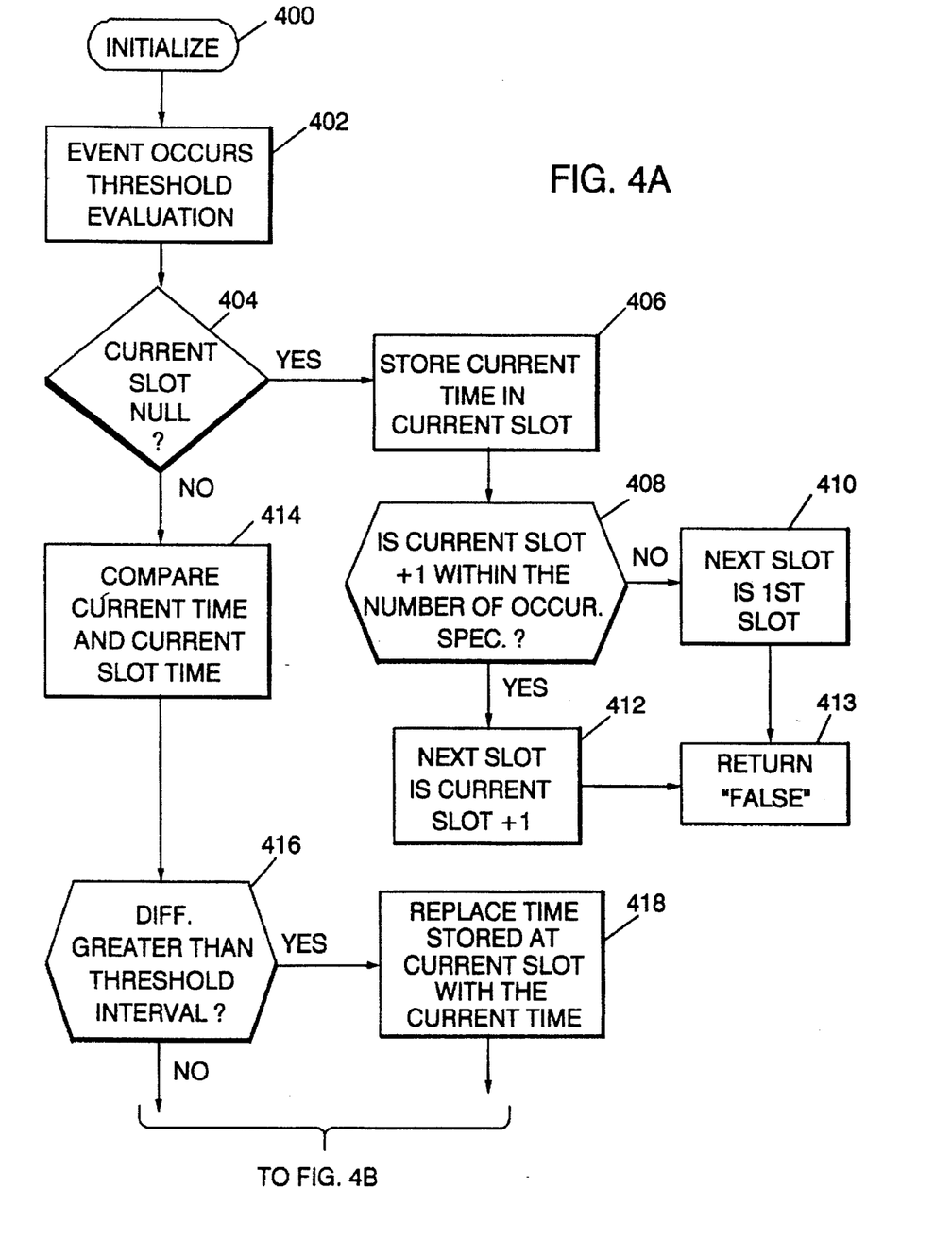
FIGS. 4A–4B illustrate a flowchart indicating the algorithm for threshold occurrence detection.
Figure 4B:
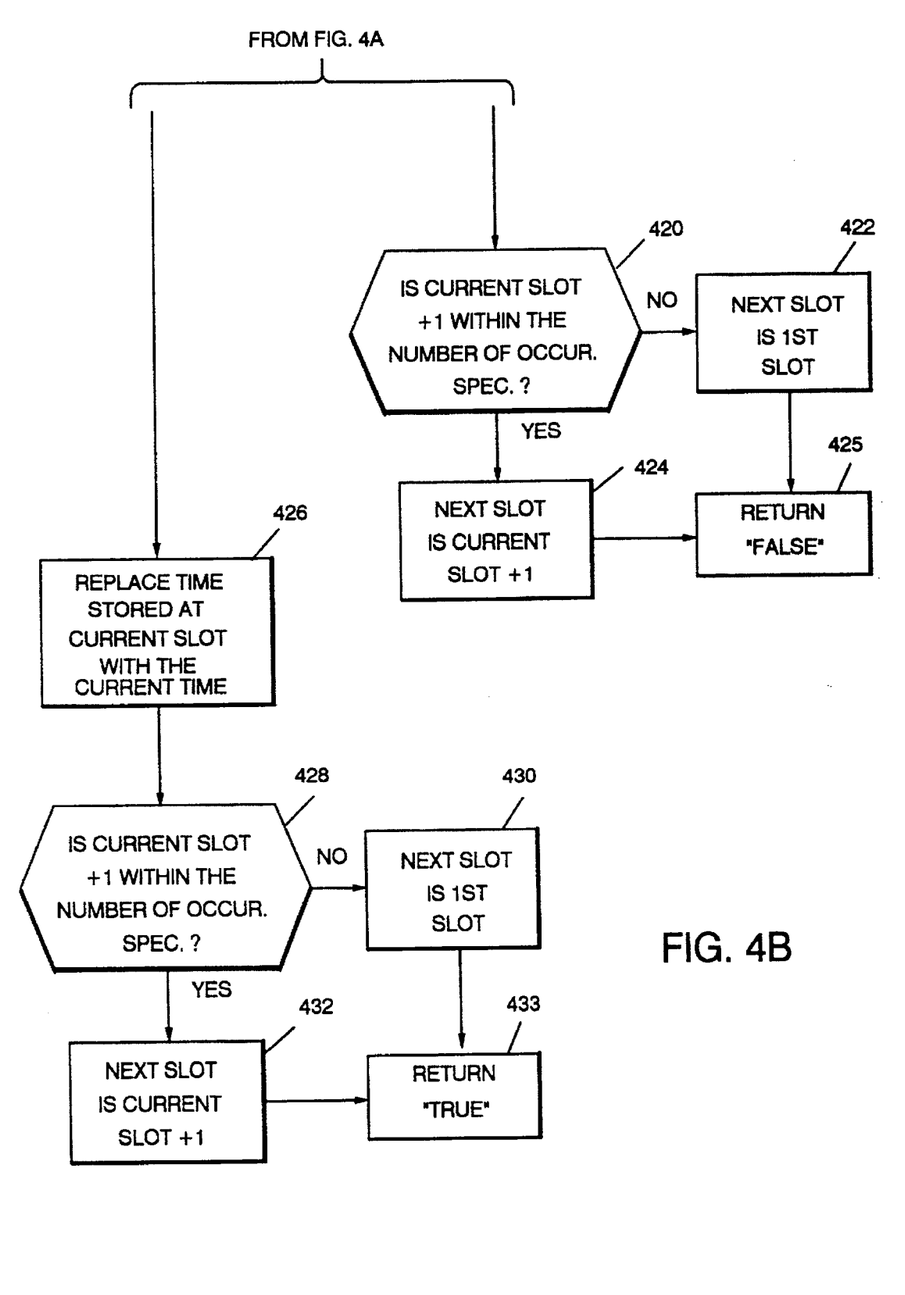

The algorithm implemented by this invention is represented by the flowchart of FIGS. 4A and 4B. In the initialization step of logic block 400, the network operator specifies one or more threshold conditions for network devices and enters them into the automation table. The network operator also activates the table containing the threshold conditions. Storage is allocated at this step to permit the saving of timestamps associated with the occurrence of events such as messages and alerts. Logic block 402 represents the start of processing when an event occurs as signalled by the receipt of a message or alert at the network management control program 3. The first step in threshold evaluation is indicated by decision block 404 where a check is made to determine if the next slot is empty. If the next slot is empty, the timestamp associated with the event is stored in the current slot identified by the slot pointer. A FALSE indication is returned to the network management control program 3 (logic block 413) indicating that the threshold condition has not been reached. In this algorithm, the next slot is defined as the current slot plus one if within the specified number of occurrences. Otherwise, the next slot is the first slot allocated.

After step 406 is processed, a test is performed in decision block 408 to determine if the current slot plus one is within the specified number of occurrences. If it is, then the next slot is set to the current slot plus one and the pointer is set to that position, as indicated by logic block 412. Otherwise, the next slot is set to the first slot as shown by logic block 410. Control then returns to logic block 402 to await the occurrence of another even t.

If in decision block 404, the next slot is determined to contain a timestamp representing the occurrence of a previous event, the next action is to compare the current time associated with the new event and the time stored in the next slot as indicated in logic block 414. In decision block 416, a test is made to determine if the difference between the current event time and the time stored in the current slot is greater than the specified time threshold interval. If the difference exceeds the threshold interval, then the time stored in the current slot is replaced with the timestamp associated with the current event, as indicated in logic block 418. This means that the threshold number of occurrences has not occurred within the specified time interval. If logic block 418 is executed (i.e., the time difference exceeds the threshold interval), then in decision block 420 a test is performed to determine if the current slot plus one is within the specified number of occurrences. If it is not, then the next slot is the first slot as indicated in logic block 422 and the pointer is returned to the first slot. Otherwise, the next slot is the current slot plus one and the pointer is set to that position as indicated by logic block 424. In either case, a FALSE indication is also returned to the network management control program 3 as indicated by logic block 425. Control returns to logic block 402.

If the difference time is less than the threshold time in decision block 416 which means that the threshold condition has been reached, then in logic block 426, the time stored in the current slot is replaced with the time of occurrence of the current event. This is followed by the step indicated by decision block 428 in which a test is made to determine if the current slot plus one is within the specified number of occurrences. If no, then as indicated in block 430, the next slot is again the first slot, and the pointer is set to that position. If the current slot plus one is within the specified number of occurrences, then the next slot is set to the current slot plus one as indicated in logic block 432. In either case, a TRUE indication is returned to the network management control program 3 as indicated in logic block 433. Control then returns to logic block 402 to await the occurrence of the next event.

In the actual implementation of the invention in the IBM NetView network management program product, the IF-THEN statement enables the network operator generating the automation table 7, to specify messages and alerts (MSU's) that the network management control program 3 is to intercept and process. The network operator uses the statement to code the conditions that a message or alert must meet in order to be selected for automation, and the action to be taken by the network control management program 3 if a condition is met.

In the NetView program product, the syntax of the IF-THEN statement is as follows:

IF condition_item=|¬= compare_item THEN actions where:

condition_item is the item being compared;

=|¬= indicates how the condition item is to be compared to the compare item;

= indicates that if the condition item equals the compare item, the condition is true;

¬= indicates that if the condition item does not equal the compare item, the condition is true;

compare_item the item that is being compared with the condition item;

actions specifies the action(s) to be taken if the IF test returns TRUE,

The THRESHOLD condition item was added to the NetView network management control program 3 to implement the invention. The syntax for the THRESHOLD condition is as follows:

THRESHOLD (occurrence_number [time_period])

The THRESHOLD condition item returns an indication of whether the threshold condition item has been evaluated against at least occurrence_number of times during the prior time_period. The parameters for the THRESHOLD condition item are as follows:

occurrence_number specifies the number of occurrences within the specified time period that cause the threshold condition to be reached.

time_period specifies the time interval of the threshold; the default is 24 hours and the time period is specified as ddd hh:mm:ss, where ddd is number of days in the range 0–365;

hh:mm:ss is hours (00–23), minutes (00–59), and seconds (00–59), respectively.

Table 1 shows examples of valid THRESHOLD condition specifications.

```
IF MSGID = 'XYZ123I' &
    THRESHOLD (5 0 3:00:00) = '1' THEN
        < ACTIONS >.
```

The evaluation count will be incremented if the sequential search through the active automation table reaches this statement and the message ID is XYZ123I. The automation actions will only be done for the fifth or subsequent XYZ123I message that reaches this statement during the automation table search for any three hour time period.

An ending occurrence number, that is, a point at which the network operator no longer wants to take a certain action, can be defined by combining two THRESHOLD condition items in one statement. For example, if the network operator wants certain actions to occur only on the third through sixth occurrence of message XYZ123I within any one hour time period, the following automation table statement can be used:

```
IF MSGID = 'XYZ123I' &
    THRESHOLD (3 0 01:00:00) = '1' &
    THRESHOLD (5 0 01:06:00) = '0' THEN
        < ACTIONS >.
```

In this situation table statement, the second threshold condition item is evaluated only after the first threshold is met, starting with the third occurrence of the XYZ123I message within a one hour time period. The fifth evaluation of the second threshold condition item is the seventh occurrence overall of the XYZ123I message.

As described previously, every threshold condition specified in the automation table will require five bytes of storage

TABLE 1

| SPECIFICATION | OCC. # | DAYS | HOURS | MIN. | SEC. |
|---|---|---|---|---|---|
| THRESHOLD(3) = '1' | 3 | 1 | | | |
| THRESHOLD(4 1 00:00:00) = '1' | 4 | 1 | | | |
| THRESHOLD(5 1:00) = '1' | 5 | | 1 | | |
| THRESHOLD(6 0 1:00:00) = '1' | 6 | | 1 | | |
| THRESHOLD(7 10) = '1' | 7 | | | 10 | |
| THRESHOLD(8 :30) = '1' | 8 | | | | 30 |
| THRESHOLD(9 10 10) = '1' | 9 | 10 | | 10 | |
| THRESHOLD(10, 10 00:10:00) = '1' | 10 | 10 | | 10 | |

The values returned by THRESHOLD will be a bit string of '1' if the number of occurrences within the prior time_period is equal to or greater than the occurrence_number specified. The value returned by THRESHOLD will be a bit string of '0' for all other times.

The count of evaluations will only be incremented if the THRESHOLD condition_item is reached during the sequential search through the automation table for matches. The count of evaluations will not be incremented if the statement with the THRESHOLD condition_item is not reached due to a prior statement match in the table or conditional logic that resulted in the statement not being evaluated. The count of evaluations will also not be incremented if a prior condition in the automation table statement that is logically ANDed evaluates FALSE. As an example:

multiplied by its occurrence_number in order to store a time stamp when that occurrence is reached. The statement THRESHOLD (50 0 01:00:00) will require 250 bytes of storage to store the occurrence time stamps, in addition to the storage required for the statement.

Figure 5:
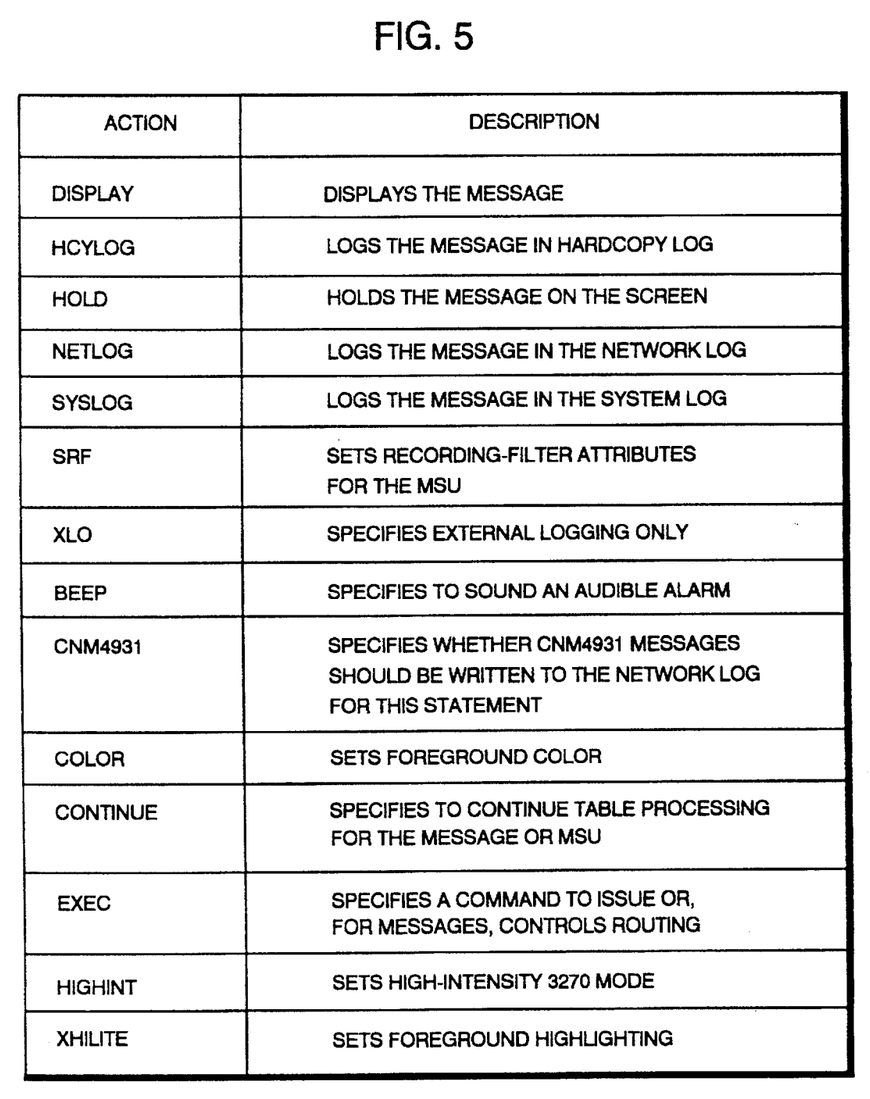
FIG. 5 illustrates the actions that can be taken by the automation table as a result of a threshold condition being detected.

The actions that can be performed through the automation table 7 as a result of the threshold condition item being reached are illustrated in FIG. 5. In particular, the EXEC action indicates an action to be processed by the network management control program 3. The syntax for the EXEC action is as follows:

EXEC ([CMD (cmdstring)][ROUTE (routeparms)])

where

CMD indicates a command, command list, or command processor the network management control program is to execute;

cmdstring is the actual command string;

ROUTE indicates that the cmdstring is to routed to the identified operator or tasks;

routeparms specifies the operators or tasks to when the cmdstring should be routed for processing.

A few simple discrete examples will serve to illustrate how the threshold condition can be used to control actions by network management control program 3 through the automation table 7. In the first example, the network operator wants the device or application to be recovered several times by automation, and if failure continues to occur, the network operator is to be notified that human intervention is required.

EXAMPLE 1

```
IF MSGID = 'IST102I' THEN
    BEGIN;
        IF THRESHOLD (3 7 00:00:00) = '0' THEN
            EXEC (CMD ('VTAMSTRT')
                ROUTE (ONE AUTOVTAM AUTO1 PPT *))
            EXEC (CMD ('MSG SYSOP AUTOMATION RESTARTING VTAM')
                ROUTE (ONE AUTO1 PPT *));
        ALWAYS
            EXEC (CMD ('MSG SYSOP VTAM DOWN-ASSISTANCE REQUIRED')
                ROUTE (ONE AUTOVTAM AUTO1 PPT *));
    END;
```

This automation table entry translates into actions as follows. If VTAM becomes inactive (indicated by message IST102I) and it is the first or second time during the week, attempt to restart VTAM and let the system (network) operator know that automation is restarting it. In this case, processing by the automation table stops before the next statement. If it is the third or subsequent time that VTAM has become inactive this week, then a message is sent to the system operator to inform him of the problem so that he can intervene manually.

In the second example, the network operator is addressing the situation in which a message is received periodically for a failure condition until the condition is resolved. In this case, the network operator wants to change the frequency with which the message is received.

EXAMPLE 2

```
IF MSGID = 'DWO746I' &
    THRESHOLD (2 0 1:00:00) = '1' THEN
        DISPLAY(N) NETLOG(N) SYSLOG(N);
```

This automation table entry causes a message 'DWO746I' to be displayed only the first time it is received in a one hour period. Any subsequent 'DWO746I' messages received in one hour will not be displayed or logged.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for detecting a threshold occurrence of events in a communications network without use of any counter or timer devices, said communications network having at least one processor and containing a plurality of devices, comprising the steps of:

identifying, by a network operator, a resettable threshold condition to monitor for at least one selected device of said plurality of devices;

allocating locations in memory in said at least one processor based on the threshold condition to store a plurality of timestamp values corresponding to a time of occurrence of each event for said selected device, each allocated location having an associated sequential location number said allocated locations being linked together to form a circularly-linked list;

receiving a message from said selected device by said processor when said each event occurs;

comparing the time of occurrence value of each event with the contents of a current one of said allocated locations in memory; and based on said comparing step, determining if the threshold condition has occurred.

2. The method of claim 1 further comprising the step of executing a prescribed automation procedure if the threshold condition has occurred.

3. The method of claim 1 further comprising the step of executing a prescribed automation procedure if the threshold condition has not occurred.

4. The method of claim 1 wherein the step of identifying a threshold condition for said selected device includes:

specifying a number of events that must occur before the threshold condition is reached; and establishing a time interval within which the specified number of events must occur.

5. The method of claim 4 further comprising the steps of:

marking the time of occurrence of said each event by reference to a system internal clock time generated by said at least one processor; and converting said time of occurrence of said each event into said corresponding timestamp value.

6. The method of claim 5 wherein said converting step generates said corresponding timestamp value by using the five most significant bytes of said system internal clock time.

7. The method of claim 5 wherein the step of determining includes:

calculating the difference between said corresponding timestamp value for said each event and the timestamp value stored in said allocated location in memory identified by a current location pointer;

if the calculated difference exceeds said time interval, providing an indication that the threshold condition has not been detected;

if the calculated difference does not exceed said time interval, signalling the detection of the threshold condition; and storing said corresponding timestamp value in said identified allocated location.

8. The method of claim 7 further including the steps of:

advancing said current location pointer to identify a next available allocated location for storage of said corresponding timestamp value for the time of occurrence of a next said event;

wherein said next available allocated location is the identified allocated location number incremented by one if not greater than the specified number of events; and wherein said next available allocated location is a first of said allocated locations if said identified allocated location number incremented by one is greater than the specified number of events.

9. A system for detecting a threshold occurrence of events in a communications network without use of any counter or timer devices, said communications network having at least one processor and containing a plurality of devices, comprising:

means for identifying, by a network operator, a resettable threshold condition to monitor for at least one selected device of said plurality of devices;

means, responsive to said threshold condition, for allocating locations in memory of said at least one processor to store a plurality of timestamp values corresponding to the time of occurrence of each event for said selected device, each allocated location having an associated sequential location number said allocated locations being linked together to form a circularly-linked list;

means for receiving a message from said selected device by said processor when said each event occurs;

means, cooperative with said means for receiving, for comparing the time of occurrence value of each event with the contents of a current one of said allocated locations in memory; and means, cooperative with said means for comparing, for determining the occurrence of the threshold condition.

10. The system of claim 9 further comprising automation means, cooperative with said means for determining, for executing a prescribed procedure upon the occurrence of the threshold condition.

11. The system of claim 9 further comprising automation means, cooperative with said means for determining, for executing a prescribed procedure if the threshold condition has not occurred.

12. The system of claim 9 wherein said threshold condition specifies a number of events that must occur to reach the threshold condition and establishes a time interval during which the number of events must occur.

13. The system of claim 9 further comprising:

means for marking the time of occurrence of said each event by reference to a system internal clock time; and means for converting said time of occurrence of said event into said corresponding timestamp value.

14. The system of claim 13 wherein said means for converting generates said corresponding timestamp value by using the five most significant bytes of said internal clock time.

15. The system of claim 13 wherein said means for determining includes:

means for calculating the difference between said corresponding timestamp value for said each event and the timestamp value stored in said allocated location in memory identified by a current location pointer;

means, cooperative with said means for calculating for signalling the detection of the threshold condition; and means, cooperative with said means for calculating, for storing said corresponding timestamp value in said allocated location.

16. The system of claim 15 further including:

means, cooperative with said means for allocating and said means for storing, for advancing said current location pointer to a next available allocated location for storage of said corresponding value for the time of occurrence of a next said event;

wherein said next available allocated location is the identified allocated location number incremented by one if not greater than the specified number of events; and wherein said next available allocated location is a first of said allocated locations if said identified allocated location number incremented by one is greater than the specified number of events.

* * * * *